Nov. 28, 1967     R. A. DEIBEL     3,355,198
TRANSMISSION LINKAGE ASSEMBLY
Filed April 24, 1964
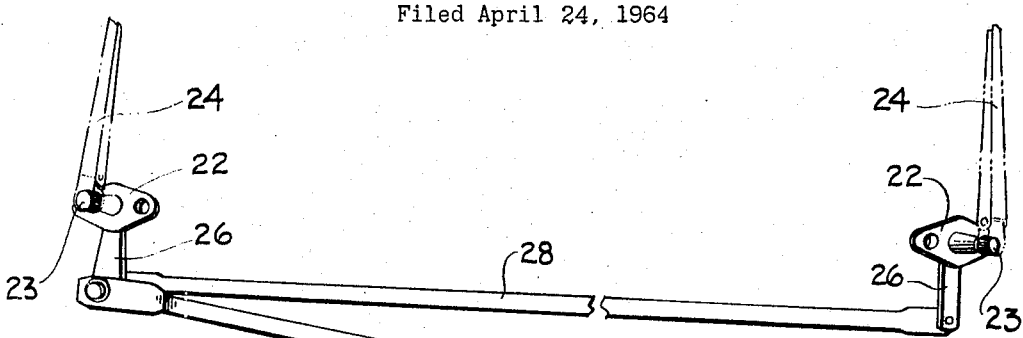
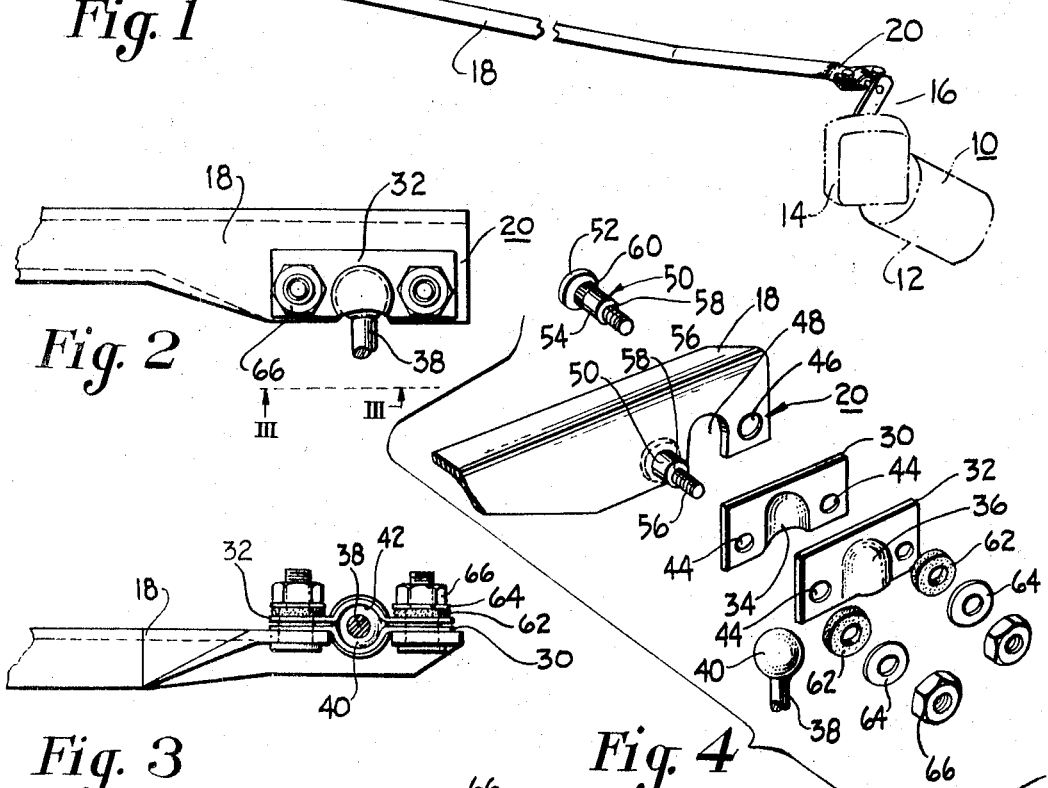
INVENTOR.
RAYMOND A. DEIBEL
BY
*E. Herbert Liss*
ATTORNEY.

United States Patent Office 3,355,198
Patented Nov. 28, 1967

3,355,198
TRANSMISSION LINKAGE ASSEMBLY
Raymond A. Deibel, Cheektowaga, N.Y., assignor to Trico Products Corporation, Buffalo, N.Y.
Filed Apr. 24, 1964, Ser. No. 362,223
3 Claims. (Cl. 287—87)

The present invention relates to improved windshield wiper transmission linkage assemblies and, more particularly, to an improved ball joint for pivotally securing a pair of link elements to each other.

In transmission linkage assemblies for motor vehicle windshield wiping apparatus, certain pivotal connections require a ball joint connection because of universal motion at a joint. Such ball joint assemblies include a pair of socket plates which have opposing complementary socket halves formed therein to provide a fit for a ball stud having a spherical end adapted to be received within the socket formed by the socket halves. The link element may be notched out to provide for reception of the socket. Suitable means are provided for rigidly clamping the socket plates to the link element and to clamp the plates together to retain the ball therebetween for universal pivotal movement.

Because of variations in the dimensions of the part due to normal production tolerances and because of mass assembly techniques, the clamping means may be over-tightened. When this occurs an excessive load is placed on the wiper motor in order to move the link elements relative to each other. Rigidity of the ball joint may cause immediate or eventual burn out of the motor and, in less extreme cases, erratic and unsatisfactory wiper operation.

Another problem inherent in present ball joint construction for wiper transmission linkage is excessive looseness resulting in erratic and noisy operation of the wiper system. Such looseness may occur either because of normal wear during use or because of the variations in dimension arising from reasonable manufacturing tolerances.

The present invention utilizes a unique ball joint construction wherein a threaded stud and nut is utilized as means to detachably clamp the socket plates together. The unique construction of the present invention prevents over-tightening of the clamping means and prevents freeze-up or excessive rigidity of the ball joint while, at the same time, it assures sufficient snugness of the ball in the socket for maximum effectiveness in operation. This construction avoids a sloppy fit of a ball joint as well and provides means for wear compensation in addition to avoiding an excessively tight fit. The invention employs a resilient clamping construction which simplifies and expedites assembly and provides proper fit of the ball and socket joint in a positive manner. This detachable ball joint is particularly useful in securing the crankarm of the wiper system power unit to the adjacent linkage element. This readily detachable ball joint permits removal of the power unit for repair or replacement without requiring removal of the transmission linkage assembly.

The principal object of the present invention is to provide an improved ball and socket joint which eliminates ball and socket joint freeze-up, but avoids looseness of the joint.

Another object of the invention is to provide an improved ball joint construction which facilitates assembly, permits reasonable manufacturing tolerances, compensates for wear at the joint and is readily detachable.

A further and more specific object of the invention is to provide an improved ball and socket joint for windshield wiper linkage which employs a resilient, detachable clamping arrangement for securing socket halves together and to a link element which positively maintains optimum clamping force and compensates for dimensional differences occurring with reasonable manufacturing tolerances and for looseness due to wear during use.

Other objects and advantages of the invention will be apparent from the following detailed description taken in connection with the accompanying drawings in which:

FIG. 1 is a front elevational view of windshield wiper apparatus for a motor vehicle;

FIG. 2 is a top elevational view of the ball joint assembly of this invention;

FIG. 3 is a front elevational view of the ball joint assembly of this invention similar to FIG. 2 taken in the direction of the arrows III—III;

FIG. 4 is an exploded perspective of the ball joint assembly of this invention; and FIG. 5 is a front elevational view similar to FIG. 3 of a modified form of the invention.

Briefly, the ball joint assembly of this invention includes a pair of ball joint socket plates having spherical socket halves formed therein. The socket plates are mounted on a linkage element with the socket halves in complementary opposing relation. A stud having a spherical head is secured to a second link element. The spherical head is received between the socket halves. The socket plate halves include openings adjacent each end which are in alignment and which are also in alignment with corresponding openings on the link element to which they are secured. Headed studs are provided which extend through these aligned openings and have a reduced diameter threaded end portion for receiving a suitable nut to clamp the plates in position. The junction between the reduced diameter threaded portion of the stud and the remainder of the stud forms a radially extending annular shoulder which serves as a stop to prevent excessive tightening of the nut. A portion of the stud adjacent the head is knurled to rigidly secure the stud in the first mentioned link. Disposed intermediate the clamping nut and the adjacent socket plate is an annular resilient ring which is received on the large diameter portion of the stud and extends axially to a position overhanging the annular shoulder. Thus it can be seen that when the nut is tightened on the reduced threaded portion of the stud, the resilient ring becomes compressed and pressure is applied to secure the plates together and to the link element with the ball retained in the ball socket. The resilient ring compensates for dimensional differences in corresponding parts and for wear at the joint. The shoulder formed by the junction between the reduced portion of the stud and the enlarged portion of the stud serves as a stop to prevent excessive tightening of the nut. Upon loosening of the nut, the socket plates can be separated and the ball stud can be removed from the socket. In a modification of the invention, the resilient ring is interposed between the link element and the socket plate adjacent thereto.

In FIG. 1 there is shown windshield wiper apparatus which includes a power unit 10. The power unit 10 may include a motor of any suitable type as, for example, a hydraulic motor, a vacuum motor or an electric motor 12 and a gear reduction unit 14 driven thereby, as shown. The output shaft, not shown, of the gear reduction unit 14 has mounted thereon for rotation therewith a motor crankarm 16 which is pivotally secured at one end to an elongated link element 18 which serves as a driving link. The crankarm 16 and link 18 may be pivotally secured to each other by a ball and socket joint 20. Pivot shaft assemblies 22 are provided which are adapted to be mounted on the cowl of a motor vehicle and include rockshafts having driving burrs 23 upon which windshield wiper arms 24 are mounted for rotation therewith.

The pivot shafts (not visible) at their inner end have mounted thereon for rotation therewith crankarms 26 which are connected to each other at their free ends by an elongated link 28. The link element 18 may be pivotally secured to one of the crankarms 26 as shown in FIG. 1. Although the ball and socket joint of this invention is illustrated for connecting the crankarm 16 to the link 18, it will be understood of course that this ball joint, in accordance with the broader aspects of the invention, may be utilized to pivotally connect any pair of linkage elements.

The ball and socket joint 20 of this invention, most clearly shown in FIGS. 2, 3 and 4, includes an inner socket plate 30 and an outer socket plate 32 which have formed therein opposing socket halves 34 and 36, respectively. The socket plates 30 and 32 may by of any suitable material which provides a good bearing surface as, for example, Phosphor bronze. A ball stud 38 is provided having a spherical head 40 for reception in the socket 42 formed by the socket halves 34 and 36 when assembled. The ball stud 38 may be mounted on a first link as, for example, at the free end of crankarm 16 with its spherical head 40 at its free end disposed intermediate the socket halves 34 and 36. The plates 30 and 32 include adjacent their ends corresponding openings 44. Corresponding openings 44 are disposed in alignment on each of the plates 30 and 32. The plates may be mounted adjacent the end of a second link element as, for example, driving link 18. Driving link 18 includes a pair of openings 46 and a notched out portion 48. The openings 46 in the link 18 are in alignment with corresponding openings 44 in the plates 30 and 32 and the notched out portion 48 receives the socket 34. A pair of substantially identical studs 50 are provided which extend through the openings 44 and 46. The studs 50 include a head 52, a shaft portion 54 of enlarged diameter, and a threaded shaft portion 56 of reduced diameter. The junction between enlarged diameter shaft portion 54 and reduced diameter shaft portion 56 forms a radially extending annular shoulder 58 for a purpose to be hereinafter described. A section 60 of the enlarged shaft portion 54 is knurled to provide rigid non-rotatable engagement with the opening 46 in link element 18. The axial width of the knurled section 60 may be smaller than or equivalent to, but no greater than the thickness of the portion of link 18 which includes the opening 46 and the knurled portion 60 is of such diameter as to effect a pressed fit in the opening 46. The openings 44 in the plates 30 and 32 are received preferably with a loose fit on the smooth section of the enlarged diameter shaft portion 54 of stud 50. A resilient ring 62 of rubber, neoprene or other suitable elastomeric material, is received on the enlarged diameter portion 54 of each of the studs 50 and is of sufficient axial thickness to overhang reduced threaded portion 56 of the stud 50. The ring 62 lies adjacent the plate 32 on one side and a washer 64 may be disposed on the stud 50 adjacent the side of the ring 62 remote from the plate 32. Finally there is received on the threaded portion 56 of stud 50 a nut 66 which may be tightened to compress ring 62, thereby effecting secure positioning of plates 32 and 34 on link 18 with ball 40 received in the socket 42. The shoulder 58 of stud 50 forms a stop for preventing over-tightening of nut 66 and consequent excessive snugness between ball 40 and socket 42. Compression of ring 62 compensates for dimensional differences of parts which occur during the manufacturing as well as for wear during use and provides sufficient force to effect a proper fit of the ball 40 in the socket 42.

The function of this ball and socket joint construction should now be apparent. Clamping of the plates 30 and 32 with the ball 40 interposed therebetween in the socket 42 is accomplished by tightening the nut 66 to compress the resilent ring 62. Compression of the resilient ring 62 provides a force which maintains the ball and socket joint in proper assembled relationship on the links 16 and 18 to provide a universal pivotal connection. The shoulder 58 provides a stop for nut 66 which prevents over-tightening and consequent excess rigidity of the ball joint assembly 20 while, at the same time, the force applied by the compressed ring 62 prevents a loose or sloppy fit due to wear or dimensional variations. Loosening of the nut 66 permits plates 30 and 32 to be separated to allow ball 40 to be removed from socket 42. It should be noted that because of the knurling 60 on the stud 50, the axial distance between the surface of link 18 and the shoulder 58 can be maintained constant. By use of a suitable fixture, the stud can be placed into the opening 46 a fixed distance and because of the press fit the head 52 need not necessarily engage the surface of the link 18.

Another modification of the invention is shown in FIG. 5. All of the parts shown in FIG. 5 are identically equivalent to the parts shown in the modification of FIGS. 2, 3 and 4. However, the resilient ring 62 is disposed between the plate 30 and the adjacent surface of the link 18. With this modification the washer 64 may be omitted. The function of the washer 64 is to prevent relative rotation between the nut 66 and the resilient ring 62. Such relative rotation could conceivably cause distortion and disfigurement of the resilient ring 62. This cannot occur in the FIG. 5 modification.

It should now be apparent that a unique ball and socket joint for a windshield wiper linkage assembly has been provided. Certain specific embodiments of the invention have been described for the purpose of illustration, but it will be apparent that various modifications and other embodiments are possible within the scope of the invention. It is to be understood, therefore, that the invention is not limited to the specific arrangement shown, but in its broadest aspects, it includes all equivalent embodiments and modifications which come within the scope of the invention.

What is claimed is:

1. In a linkage assembly for a windshield wiper transmission comprising a pair of linkage elements pivotally secured to each other by a ball joint; said ball joint comprising a ball stud having a ball at its free end secured to one of said linkage elements, the other linkage element of said pair of linkage elements including a pair of opposing separable socket halves for reception of said ball, stud means cooperable with axially movable clamping means for securing said socket halves in position about said ball, centrally apertured resilient means of elastomeric material positioned on said stud adjacent an outer surface of one of said socket halves to be compressed by said clamping means and producing a force sufficient to maintain said socket halves in position about said ball, stop means integral with said stud means fixed in position intermediate said clamping means and the outer surface of the adjacent socket half for limiting the force applied by said clamping means, said stud means having a knurled section adjacent one end for rigidly securing said stud means at an opening in said other linkage element at a controlled distance from said stop means.

2. In a linkage assembly for a windshield wiper transmission comprising a pair of linkage elements pivotally secured to each other by a ball joint; said ball joint comprising a ball stud having a ball at its free end secured to one of said linkage elements, the other linkage element of said pair of linkage elements including a pair of opposing separable socket halves for reception of said ball, stud means cooperable with axially movable, releasable clamping means for detachably securing said socket halves in position about said ball, centrally apertured resilient means of elastomeric material positioned on said stud to be compressed by said releasable clamping means for producing a force sufficient to maintain said socket halves in position about said ball, stop means, fixed in position, integral with said stud means for limiting the force applied by said clamping means, said stud means having a knurled section adjacent one end rigidly securing said stud means at an opening in said other linkage element at a controlled distance from said stop means, said stop means being disposed intermediate said clamping means and the outer surface of the adjacent socket half.

3. In a linkage assembly for a windshield wiper transmission comprising a pair of linkage elements pivotally secured to each other by a ball joint; said ball joint comprising a ball stud having a ball at its free end secured to one of said linkage elements, a pair of socket plates secured to the other of said linkage elements having complementary opposing socket halves formed therein for reception of said ball therebetween, stud means rigidly secured to said other linkage element and extending through aligned openings in said socket plates, clamping means axially movable on said stud for retaining said socket plates in position on the other linkage element, a radially extending shoulder fixed on said stud intermediate its ends for limiting axial movement of said clamping means relative to said stud, and a centrally apertured resilient ring member adapted to be maintained under compression by said clamping means disposed on said stud intermediate the other linkage and the outer surface of an adjacent socket plate.

References Cited
UNITED STATES PATENTS

| | | |
|---|---|---|
| 952,507 | 3/1910 | Burns. |
| 1,208,620 | 12/1916 | Moser. |
| 1,797,458 | 3/1931 | Westling _____ 287—87 |
| 1,960,734 | 5/1934 | Fassinger _____ 85—1 |
| 2,374,403 | 4/1945 | Yarnall _____ 85—1 X |

FOREIGN PATENTS

| | | |
|---|---|---|
| 1,052,179 | 3/1959 | Germany. |
| 829,998 | 3/1960 | Great Britain. |

CARL W. TOMLIN, *Primary Examiner.*

A. V. KUNDRAT, *Assistant Examiner.*